(12) United States Patent
Bernstein et al.

(10) Patent No.: US 9,087,089 B2
(45) Date of Patent: Jul. 21, 2015

(54) DETERMINING SIMILARITY SCORES OF ANOMALIES

(75) Inventors: Ruth Bernstein, Kiryat Ono (IL); Ira Cohen, Medlin (IL); Chen Kahana, Gan Yavne (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 194 days.

(21) Appl. No.: 13/700,620

(22) PCT Filed: Jun. 9, 2010

(86) PCT No.: PCT/US2010/038053
§ 371 (c)(1),
(2), (4) Date: Nov. 28, 2012

(87) PCT Pub. No.: WO2011/155933
PCT Pub. Date: Dec. 15, 2011

(65) Prior Publication Data
US 2013/0080451 A1    Mar. 28, 2013

(51) Int. Cl.
*G06F 17/30* (2006.01)
*G06F 9/44* (2006.01)
*G06F 11/36* (2006.01)

(52) U.S. Cl.
CPC ............ *G06F 17/30312* (2013.01); *G06F 8/77* (2013.01); *G06F 11/3616* (2013.01)

(58) Field of Classification Search
CPC ................................ G10L 17/06; G10L 17/10
USPC ........................................................ 707/690
See application file for complete search history.

(56) References Cited

U.S. PATENT DOCUMENTS

| | | | |
|---|---|---|---|
| 6,996,628 | B2 | 2/2006 | Keane |
| 7,184,935 | B1 | 2/2007 | Cohen et al. |
| 7,222,073 | B2 * | 5/2007 | Julia et al. ..................... 704/257 |
| 7,289,960 | B2 * | 10/2007 | Julia et al. .................. 704/270.1 |
| 7,467,067 | B2 | 12/2008 | Marvasti |
| 7,620,523 | B2 | 11/2009 | Marvasti et al. |
| 2007/0294406 | A1 | 12/2007 | Suer et al. |
| 2008/0077687 | A1 | 3/2008 | Marvasti |
| 2008/0270071 | A1 | 10/2008 | Marvasti et al. |
| 2009/0006353 | A1 | 1/2009 | Vignoli |
| 2009/0228980 | A1 | 9/2009 | Zingelewicz et al. |
| 2010/0031156 | A1 | 2/2010 | Doyle et al. |
| 2010/0083054 | A1 | 4/2010 | Marvasti |

FOREIGN PATENT DOCUMENTS

CN           101038669 A           9/2007

* cited by examiner

*Primary Examiner* — Baoquoc N To
(74) *Attorney, Agent, or Firm* — Conley, Rose P.C.

(57) ABSTRACT

A method and system comprise abstracting configuration items (CI) in at least a first anomaly and a second anomaly based on type of CI. Further, CIs are matched of a common type between the first and second anomalies based on a cost function. Additionally, a similarity score is computed for the first and second anomalies based, at least in part, on the cost function of the matched CI's and based on topology of the first and second anomalies.

15 Claims, 11 Drawing Sheets

DETERMINING SIMILARITY SCORES OF ANOMALIES

BACKGROUND

When information technology (IT) specialists are called up on to fix a problem with a computer system, such specialists often are unaware of related problems that have occurred previously with other systems. The IT specialists often are forced to diagnose the problem without the benefit of being aware of similar problems on other systems.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
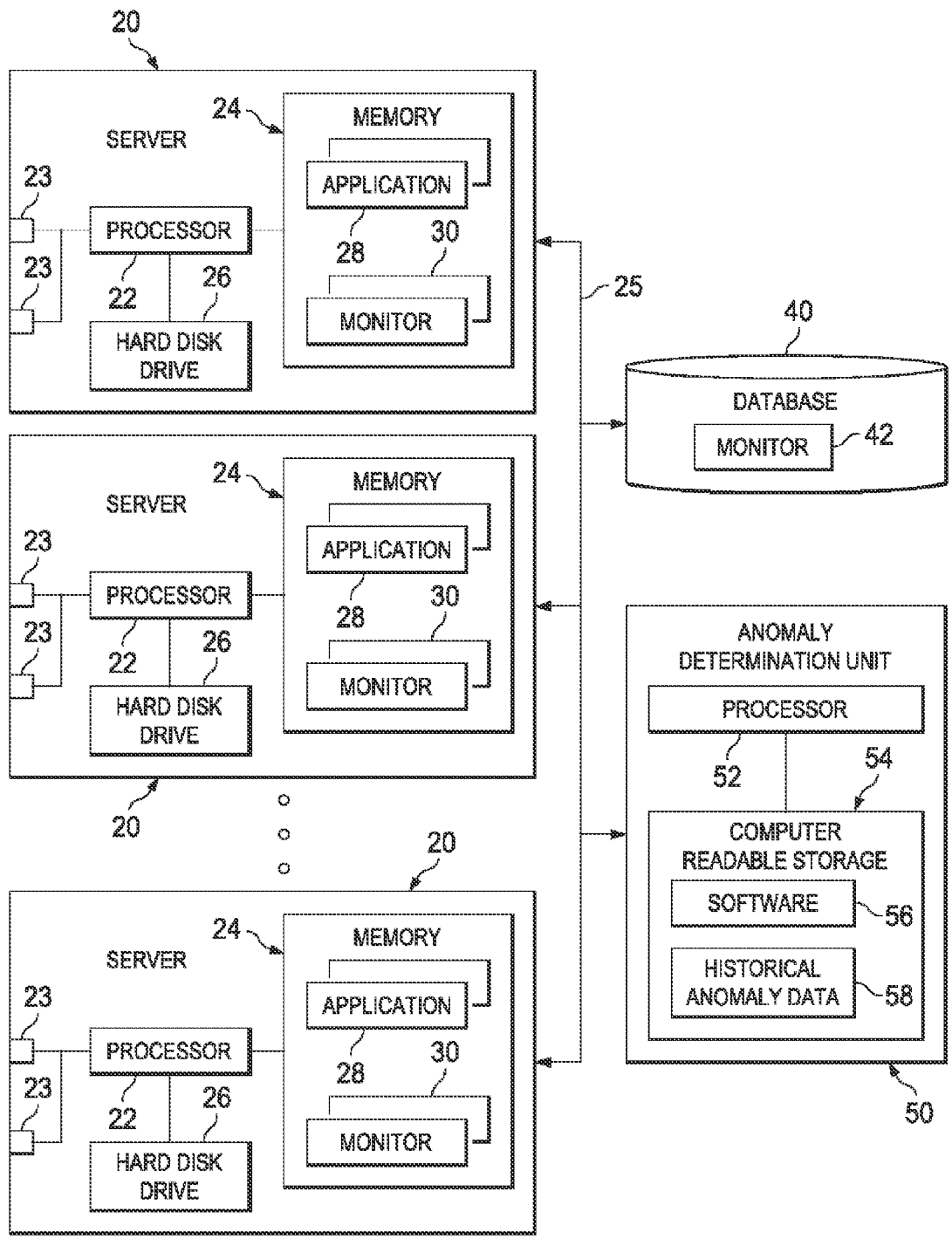
FIG. 1 shows a system in accordance with various embodiments.

FIG. 1 shows an embodiment of a network comprising one or more servers 20 coupled together and to a database 40 and an anomaly determination unit 50 via a network link 25. Each server 20 may comprise one or more processors 22 coupled to memory 24, one or more ports 23, and a hard disk drive 26. Memory 24 and the hard disk drive 26 collectively or individually comprise computer-readable storage media on which software can be stored and executed by the processor 22. The memory 24 also stores one or more applications which may be executed by processor 22.

The servers 20 and database 40 comprise "configuration items" (CI). In general, a CI comprises a hardware component or a software component whose performance, in some way, can be monitored. For example, each server 20 comprises a processor 22. Various processor metrics can be monitored such as processor utilization, designated as "CPU" (central processing unit) in this disclosure (i.e., the percentage of full capacity the processor is currently experiencing). By way of an additional example of a monitored metric associated with a server, the usage of the server's memory 24 can be monitored (e.g., percentage of memory capacity being used) and is designated as "MEM" herein. Another monitored metric of a server is referred to as "PING" which is the time required to receive a response to a message. "PORT" is another server metric which refers to the time required to receive a response from a specific port on a specific server 20. A metric designated as "PF" (page fault) refers, for example, to the frequency with which server memory accesses result in a page fault. Databases, such as database 40, also may have metrics that are monitored. For example, the QUERY metric refers to the time required to run a certain query on the database. A web server may have a REQUEST metric that is monitored. The REQUEST metric refers to the number of requests handled by a specific database instance running on the web server. Different and/or additional metrics can be monitored as well. For example, an application 28 may be monitored as well as the ports 23. In general, each metric is associated with a CI.

Referring still to FIG. 1, one or more monitors 30 are provided to monitor various metrics such as those listed above. In at least some embodiments, a monitor 30 comprises code that is executable by a processor 22. In other embodiments, a monitor may comprise a hardware logic circuit. In some embodiments, the monitors 30 are implemented as a centralized piece of code executing on a processor 22, while in other embodiments each metric to be monitored has its own monitor (executable software or hardware) that is separate from the monitors used to monitor other metrics. The monitors may be centralized or distributed throughout the network.

Each metric being monitored is monitored for anomalous behavior. A monitor 30 may be configured for a particular threshold. When the associated metric exceeds the threshold, the metric is deemed to be anomalous. For example, the CPU metric may be configured for 85%. Once the processor utilization exceeds 85% of capacity, the CPU metric is deemed to be anomalous. By way of an additional example, the QUERY metric may be configured for 500 milliseconds. A query request to a database 40 that takes longer than 500 milliseconds to run is deemed anomalous.

Each monitor 30 has an associated name. For example, a monitor 30 that monitors processor utilization for HOST1 may be named "CPU Utilization of HOST1." Each monitor 30 has a name that identifies the type of metric being monitored and the specific CI for which the metric is being monitored.

The anomaly determination unit 50 in FIG. 1 comprises a computer in at least some embodiments and, as such, includes a processor 52 coupled to a computer-readable storage medium (CRSM) 54. The CRSM 54 may comprise volatile memory (e.g., random access memory), non-volatile storage (e.g., hard disk drive, read-only memory, etc.), or combinations thereof. The CRSM 54 contains software 56 which is executable by processor 52. The CRSM 54 also includes historical anomaly data 58. Historical anomaly data 58 contains anomalous metric information for one or more networks along with such networks topology.

Figure 2:
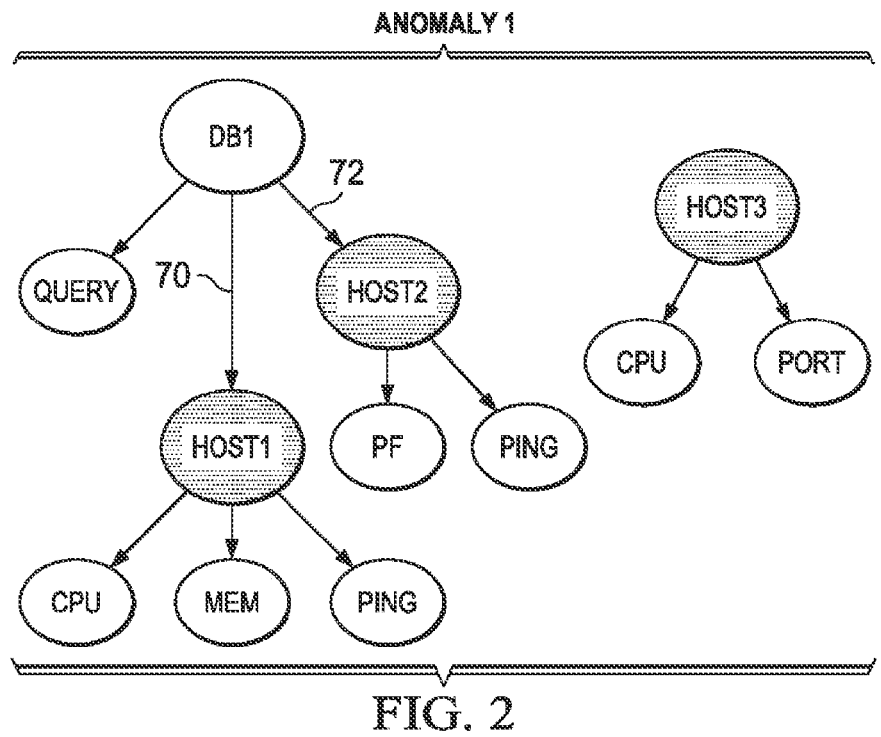
FIG. 2 shows an example of a first anomaly in accordance with various embodiments.

FIG. 2 illustrates an example of such historical anomaly data 58 for a particular network for which at least one monitored metric is deemed anomalous. The representation of FIG. 2 depicts the various CIs being monitored in that particular network along with the interdependencies of such CIs and the monitored metrics associated each such CI. The particular network depicted in FIG. 2 is referred as "Anomaly 1." In the example of Anomaly 1, four CIs are shown as designated by the larger circles—DB1 (a database) and three servers (HOST1, HOST2, and HOST3). The links 70 and 72 connecting DB1 to each of HOST1 and HOST2 designate that DB1 is dependent on each of HOST1 and HOST2, that is, that database DB1 runs on either of HOST1 or HOST2. DB1 does net run on HOST3, hence the lack of a link connecting DB1 to HOST3.

The smaller circles connected to each CI designate metrics associated with each such CI that have experienced anomalous behavior. In the example of FIG. 1, each CI—DB1, HOST1, HOST2, HOST3—has at least one monitored metric deemed anomalous. DB1 has an anomalous metric labeled QUERY which means that one or more query requests to DB1 have exceeded an associated time threshold to complete. HOST1 has three anomalous metrics—CPU, MEM, and PING. The processor and memory usage associated with HOST1 have exceeded defined thresholds. The PING anomalous metric for HOST1 indicates that a response to a message to HOST1 took longer than a threshold amount of time to be received. HOST2 has only two anomalous metrics (PF and PING) and HOST3 also has two anomalous metrics (CPU and PORT). There may be addition metrics being monitored for each CI, but the metrics shown in FIG. 1 are the metrics which have been deemed anomalous. The meaning of the larger CI circles and smaller metric circles in the remaining figures have similar meanings. The metrics shown in FIG. 2 and the remaining figures in this disclosure are only those monitored metrics that have been deemed to be anomalous. Other metrics may be monitored but are not anomalous.

Figure 3:
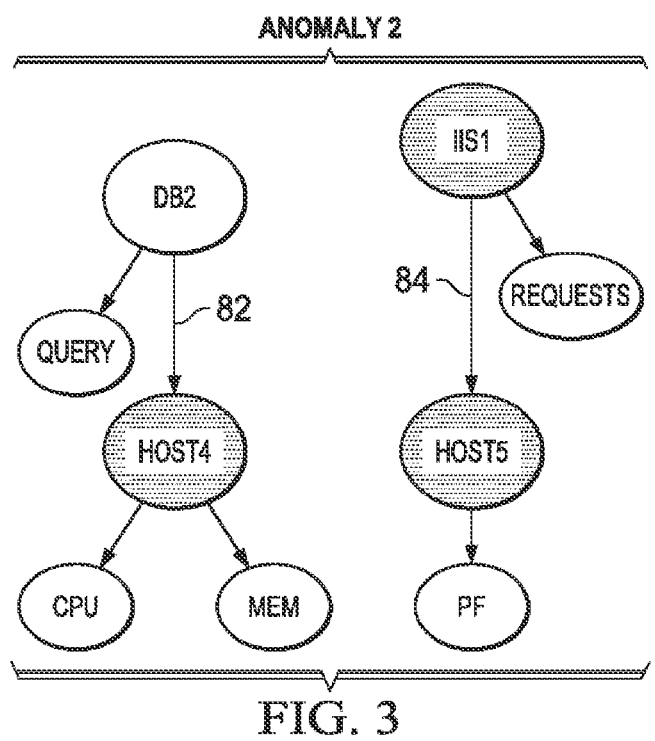
FIG. 3 shows an example of a second anomaly in accordance with various embodiments.

FIG. 3 illustrates another network representation stored in historical anomaly data 55 of anomaly determination unit 50 and containing four CIs designated as DB2, HOST4, HOST5, and IIS. The network depicted in FIG. 3 is labeled as "Anomaly2." The CI designation IIS1 (Internet Information Services) refers to a web server. DB2 is linked to HOST4 by link 82 meaning that DB2 runs on HOST4. IIS1 is linked to and thus dependent on HOST5 as indicated by link 84. DB2 has one anomalous QUERY metric. HOST4 has two anomalous metrics—CPU and MEM. HOST5 has one anomalous metric, PF. IIS1 has one anomalous metric—REQUESTS.

Figure 4:
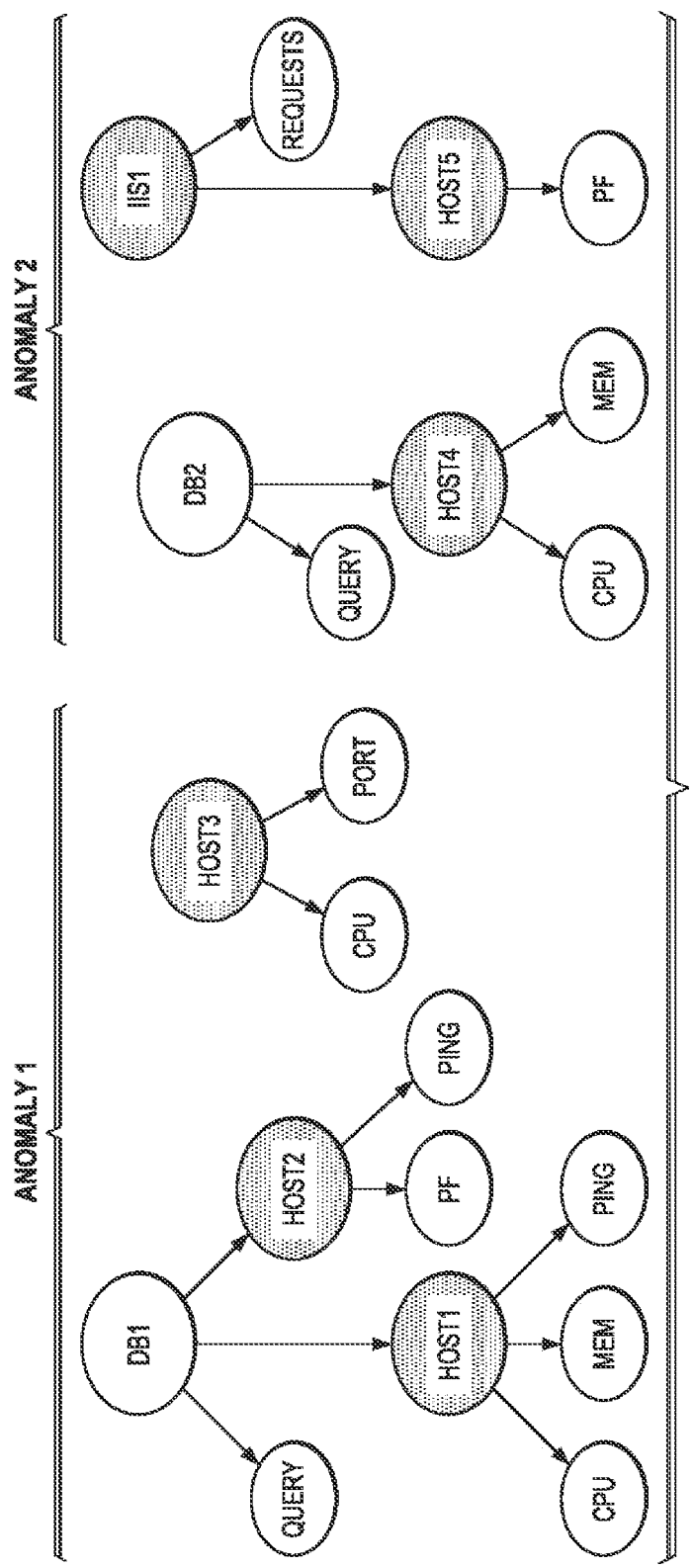
FIG. 4 further illustrates the first and second anomalies in accordance with various embodiments.

FIG. 4 shows Anomaly1 and Anomaly2 side-by-side. Each network includes one database and a plurality of servers (three servers HOST1-3 for Anomaly1 and two servers HOST4-5 for Anomaly2). Anomaly2 also includes an IIS1 CI that is not present in Anomaly1. FIG. 4 also shows the metrics for the various CIs that have been determined to be anomalous.

Figure 5:
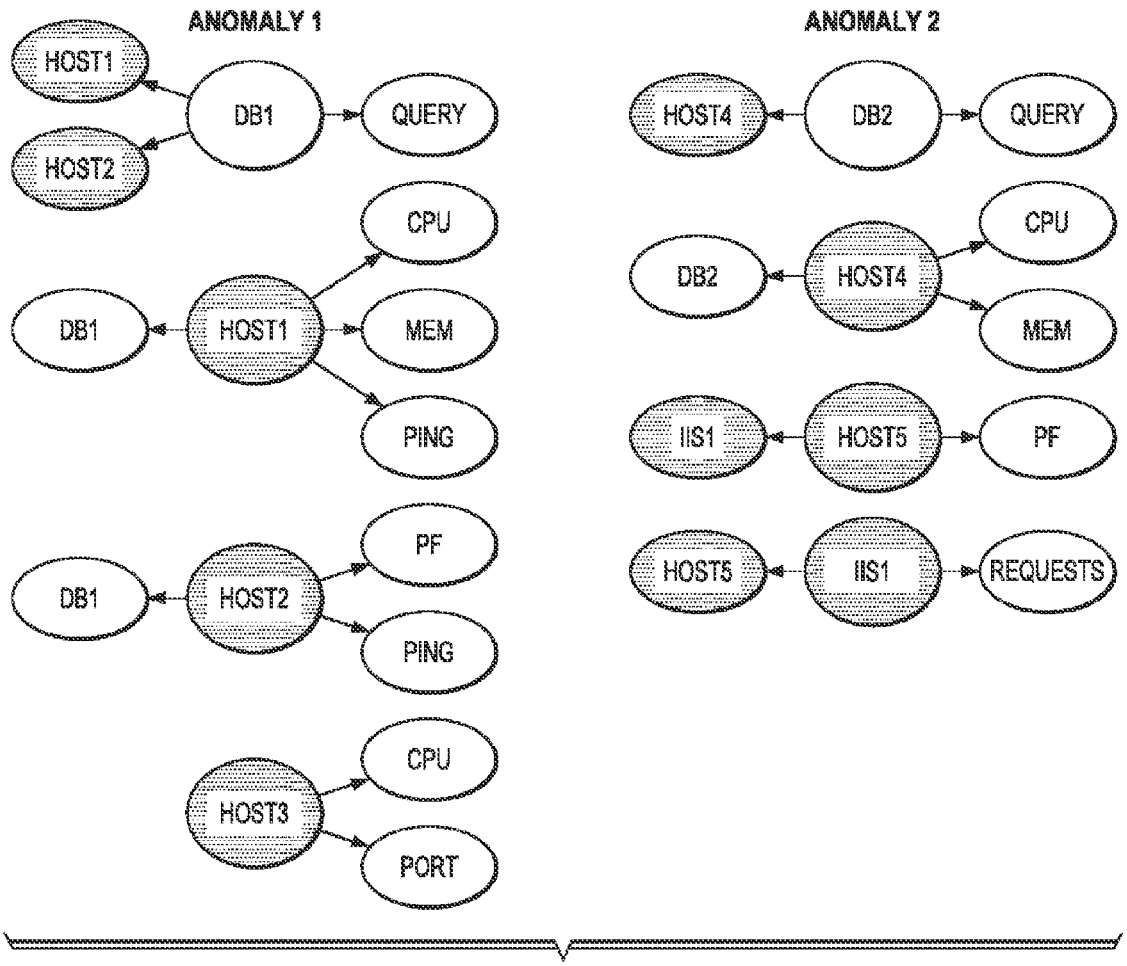
FIG. 5 shows another depiction of the first and second anomalies in accordance with various embodiments.

FIG. 5 is another depiction of Anomaly1 and Anomaly2 listing the CIs. For each CI, any neighboring CIs connected to that CI are also shown along with any associated anomalous metrics.

Figure 6:
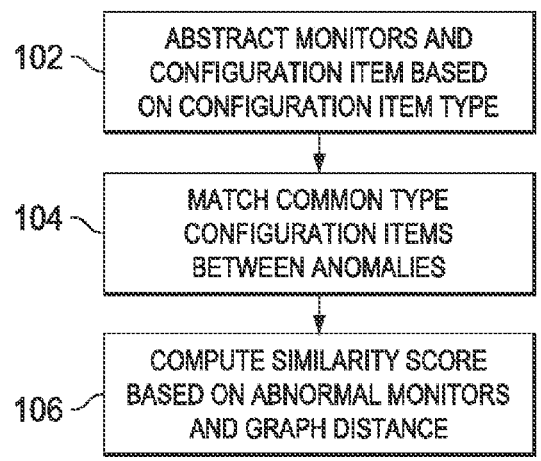
FIG. 6 shows a method in accordance with various embodiments.

FIG. 6 illustrates a method embodiment in which a similarity score is computed for two anomalies, such as Anomaly1 and Anomaly2. The anomalies for which the similarity score is computed represent a network, its topology of the dependencies between CIs, and anomalous metrics associated with the CIs. Thus, the similarity score provides a numerical indication of the similarity of the anomalous behavior of two networks. The anomalies for which the similarity score is computed may correspond to different networks or may be snapshots of the same network at different points in time.

The actions depicted in FIG. 6 may be performed by the software 56 executing on processor 52 of the anomaly determination server 50 or other computer in a network. The actions of FIG. 6 and the other method embodiments described herein may be performed in the order shown or in a different order. Further, two or more of the actions in the method embodiments described herein may be performed in parallel instead of serially.

At 102, the monitors and associated CIs are abstracted. The act of abstraction includes, at least in some embodiments, removing references to specific instances of the monitors and CIs. For example, abstracting a monitor for "CPU Utilization of HOST1" eliminates the reference to "HOST1" leaving just "CPU Utilization." By way of an additional example, abstracting the CI HOST4" includes redesignating the CI as "HOST" without reference to the specific instance of the HOST. The monitors and associated CIs are abstracted based on monitor type (CPU utilization, memory usage, etc.) and CI type (HOST, DB, IIS, etc.).

At 104, the method comprises matching common types of CIs between the two anomalies to thereby assign one or more CIs from one anomaly to specific CIs from the other anomaly. At 106, the similarity score is computed based on the anomalous metrics of the two anomalies and the topology of the inter-connected CIs and the assignment of CIs between the two anomalies.

Figure 7:
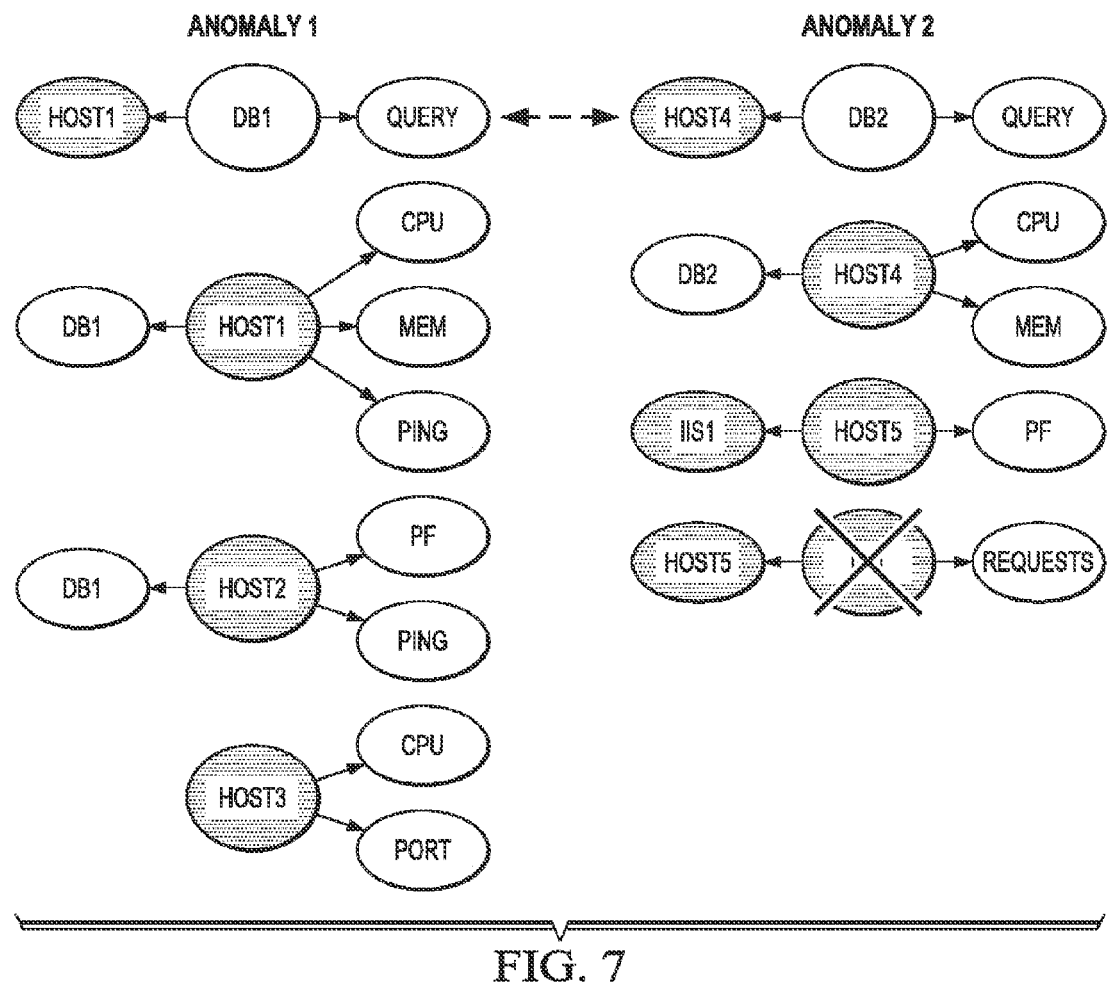
FIGS. 7 and 8 illustrate the assignment of configuration items (CI) from one anomaly with the CIs of another anomaly in accordance with various embodiments.

In action 104, as explained above a determination is made as to how to match one or more CIs from one anomaly to CIs in the other anomaly. FIGS. 7-13 further illustrate this determination. FIG. 7 shows that for DB1 in Anomaly1 there is only one CI in Anomaly2 that is of the same type (database). Thus, DB1 in Anomaly1 matches to DB2 in Anomaly2. FIG. 7 also illustrates that IIS1 in Anomaly1 has no CI of the same type in Anomaly1.

Figure 8:
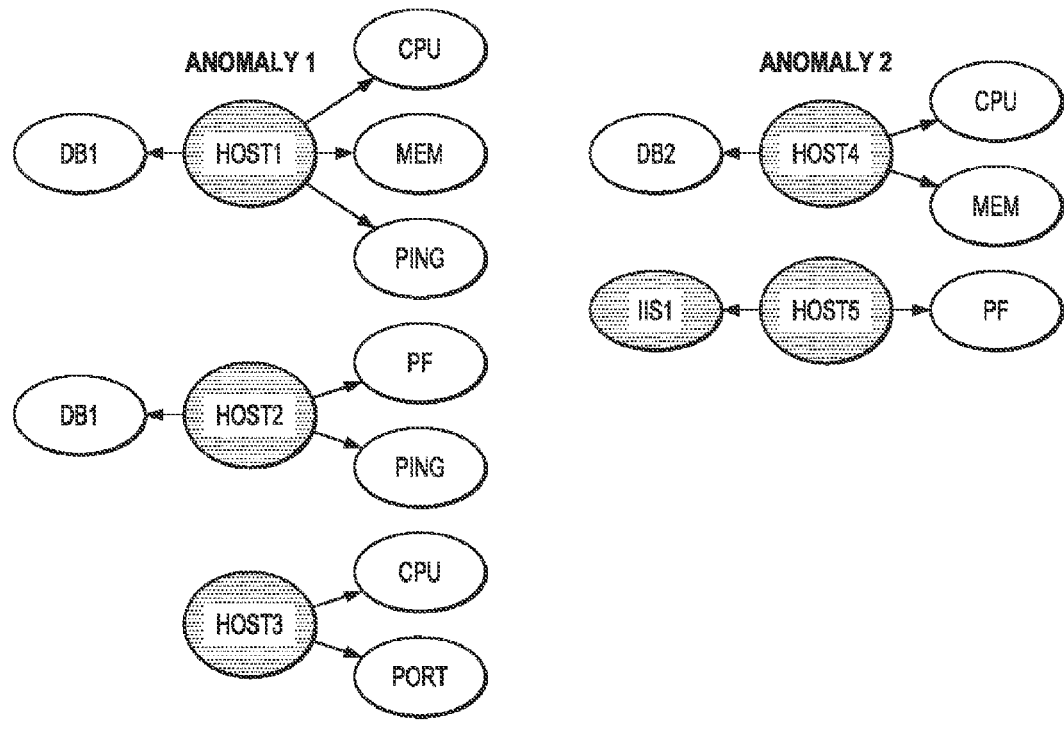

FIG. 8 depicts the remaining CIs to be matched—HOST1, HOST2, and HOST3 of Anomaly1 and HOST4 and HOST5 of Anomaly2. Action 104 determines how to match the three HOSTs of Anomaly1 with the two HOSTs of Anomaly2. Each CI of one Anomaly can only match to a single CI of the other Anomaly. Thus, two of the HOSTs of Anomaly1 will match to the two HOSTS of Anomaly2 and the third Anomaly1 HOST will not match to a HOST in Anomaly2.

Figure 9:
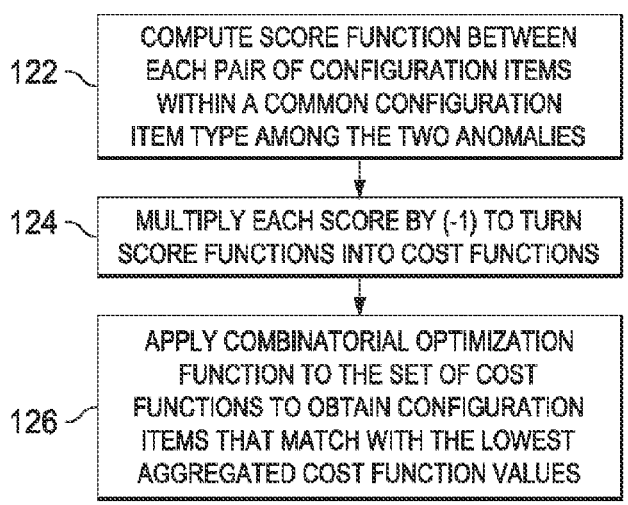
FIG. 9 shows further detail of the method of FIG. 6 in accordance with various embodiments.

FIG. 9 provides additional detail as to how the matching of the CIs between the anomalies can be accomplished. At 122, a score function is computed between each pair of CIs within a common CI type among the two anomalies (i.e., one CI from each anomaly). For example, a score function is computed for HOST1 in Anomaly1 and HOST4 in Anomaly2 and another score function is computed for HOST1 and HOST5. Similarly, score functions are computed for each of the HOST2/4 and HOST2/5 CI pairs and for the HOST3/4 and HOST3/5 CI pairs.

In accordance with at least one embodiment, the following score function is used:

$$\text{Score}(CI1, CI2) = \frac{CommonMetrics * MetricWeight + CommonNeighbors + SameInstanceIndicator}{\sqrt{TotalElements1 * TotalElements2}}$$

where CI1 is a CI from one anomaly and CI2 is a CI of the same type from the other anomaly for which the score function is to be computed. CommonMetrics represents the number of common anomalous metric types in common between CI1 and CI2. In the example of HOST1 and HOST4, both hosts have CPU and MEM metrics in common (see e.g., FIG. 4) and thus the CommonMetrics value for that pair of CIs is 2. MetricWeight is the weight given the metrics in relation to other CIs linked to CI1 and CI2. For example, a MetricWeight of 2 means that the matching of metric types is twice as important as matching neighboring CI types. Common- Neighbors is the number of neighbors of common CI types between CI1 and CI2. For example, HOST1 and HOST4 each have one connected CI and each such neighboring CI is of type DB (DB1 linked to HOST1 and DB2 linked to HOST4). Thus, the value of CommonNeighbors is 1 as between HOST1 and HOST2. SameInstanceIndicator is 1 if CI1 and CI2 are of the same CI instance (e.g., both are HOST1) and 0 otherwise.

TotalElements1 and TotalElements2 are given by the equations:

TotalElements1=TotalMetrics1*MetricWeight+Total-Neighbors1+SameInstanceIndicator TotalElements2=TotalMetrics1*MetricWeight+Total-Neighbors2+SameInstanceIndicator where TotalMetrics1 is the total number of metrics of CI1. For HOST1, there are three metrics (CPU, MEM, and PING) of HOST1. Thus, the value of TotalMetrics1 is 3 for HOST1. TotalMetrics2 is the total number of metrics of CI2. For HOST4, there are two metrics (CPU and MEM) of HOST2. Thus, the value of TotalMetrics2 is 2 for HOST4. TotalNeighbors1 is the total number of CIs linked directly to CI1. HOST1, for example, is linked to only one other CI (DB1) and thus TotalNeighbors1 for HOST1 is 1. TotalNeighbors2 is the total number of CIs linked directly to CI2. HOST4, for example, is linked to only one other CI (DB2) and thus TotalNeighbors2 for HOST4 is 1.

Figure 10:
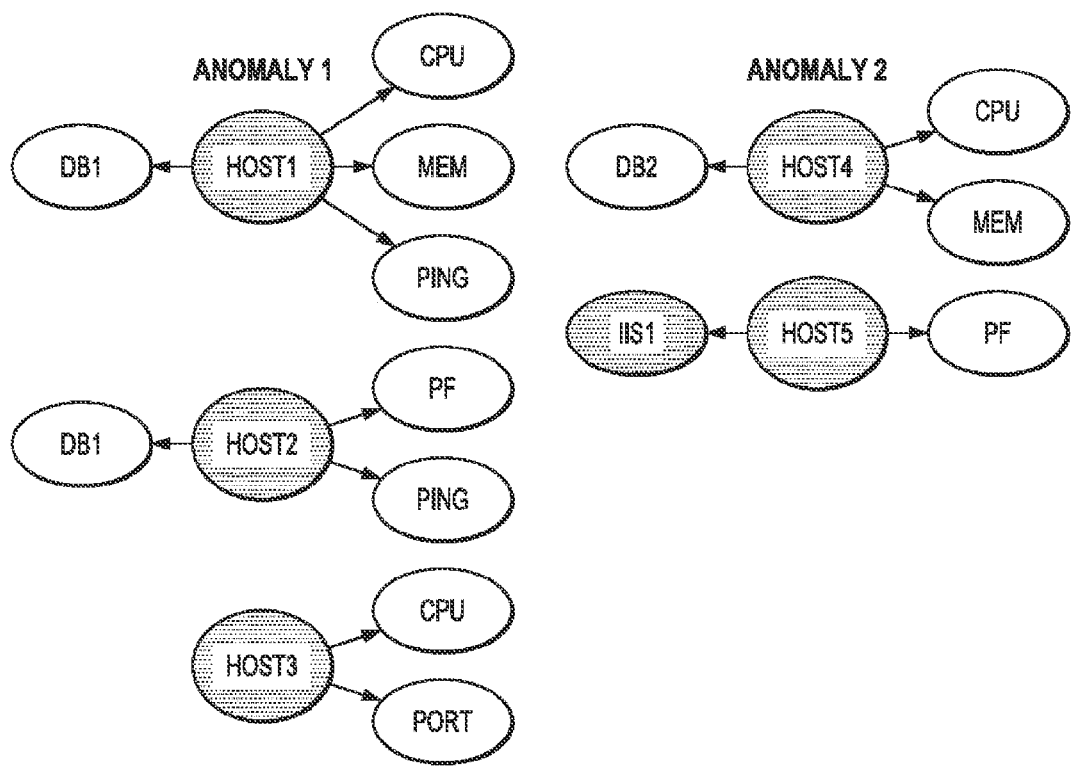
FIGS. 10-13 illustrate the application of the methods described herein to the example of FIG. 4.

FIG. 10 shows the score function calculations for four of the pairs of CIs. As can be seen the scores for HOST1 and HOST4 and for HOST2 and HOST5 are the highest of those listed and are 0.85 and 0.52, respectively.

At 124 in FIG. 9, each score function is multiplied by (−1) to turn the score functions into cost functions. At 126, a combinatorial optimization function is applied to the cost functions to match the CIs between the anomalies that results in the lowest aggregated cost function (or highest aggregated score function). The optimization function assigns CIs from one anomaly to CIs in the other anomaly in such a way that the sum of the cost functions of the assigned CIs is lower than all other possible assignments. In accordance with at least one embodiment, the Hungarian Algorithm is used in this regard.

Figure 11:
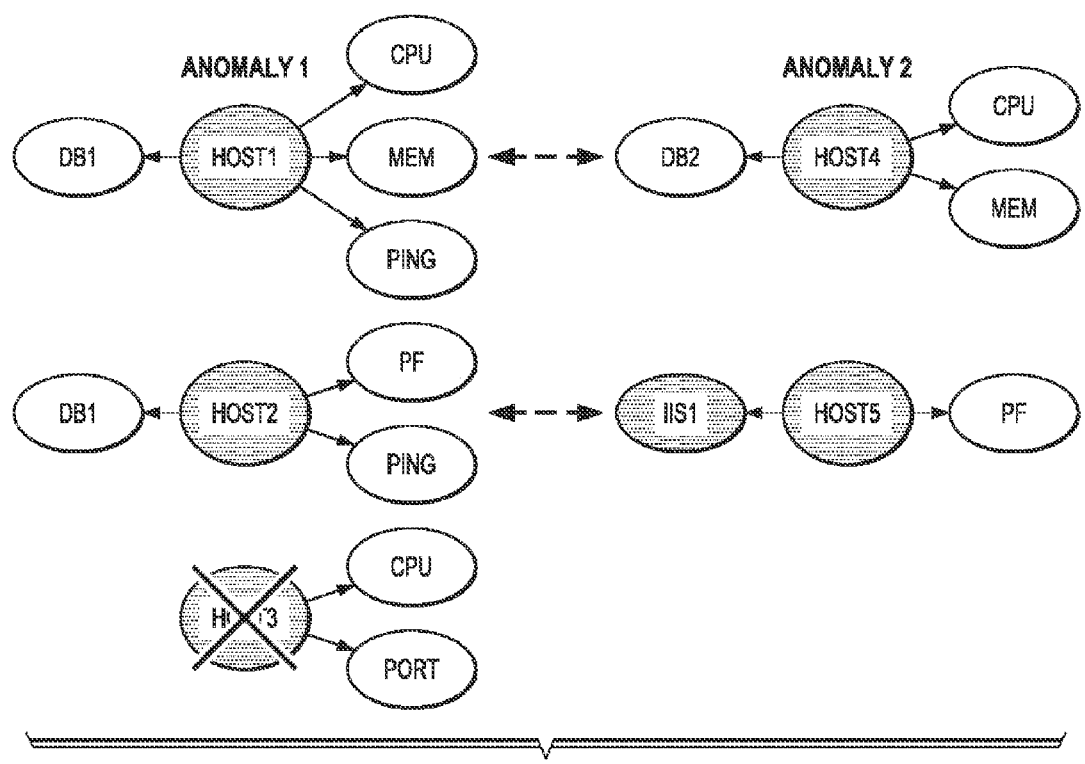
Figure 12:
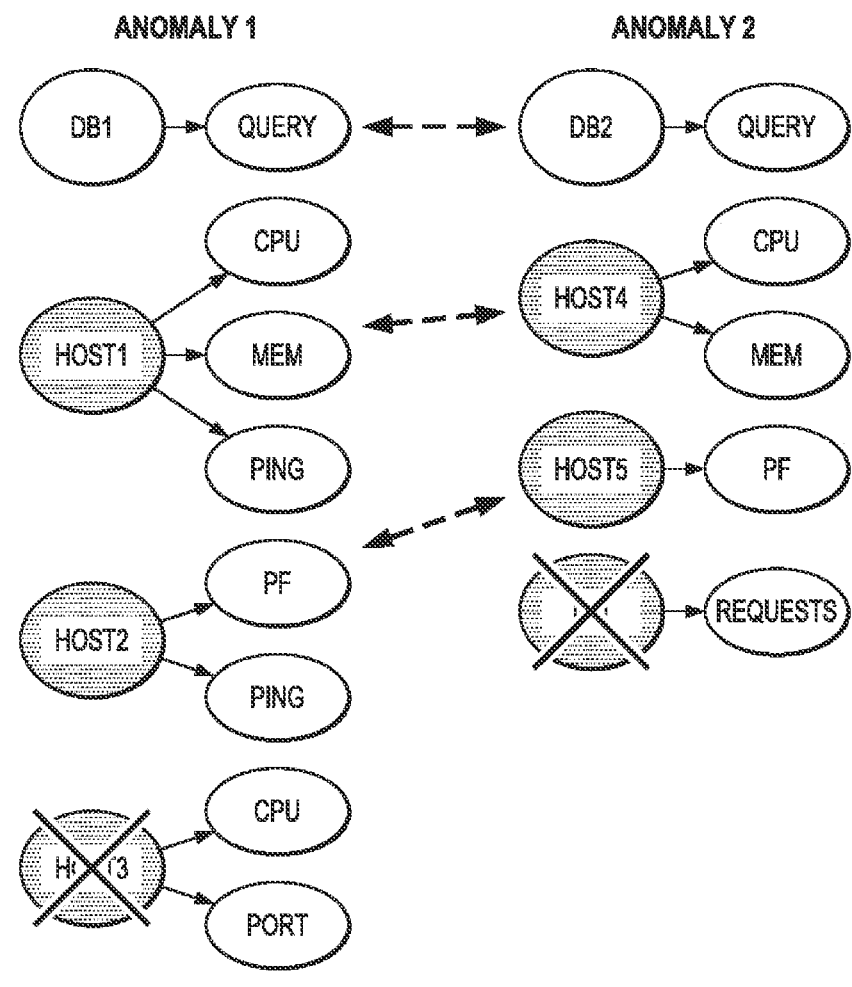
Figure 13:
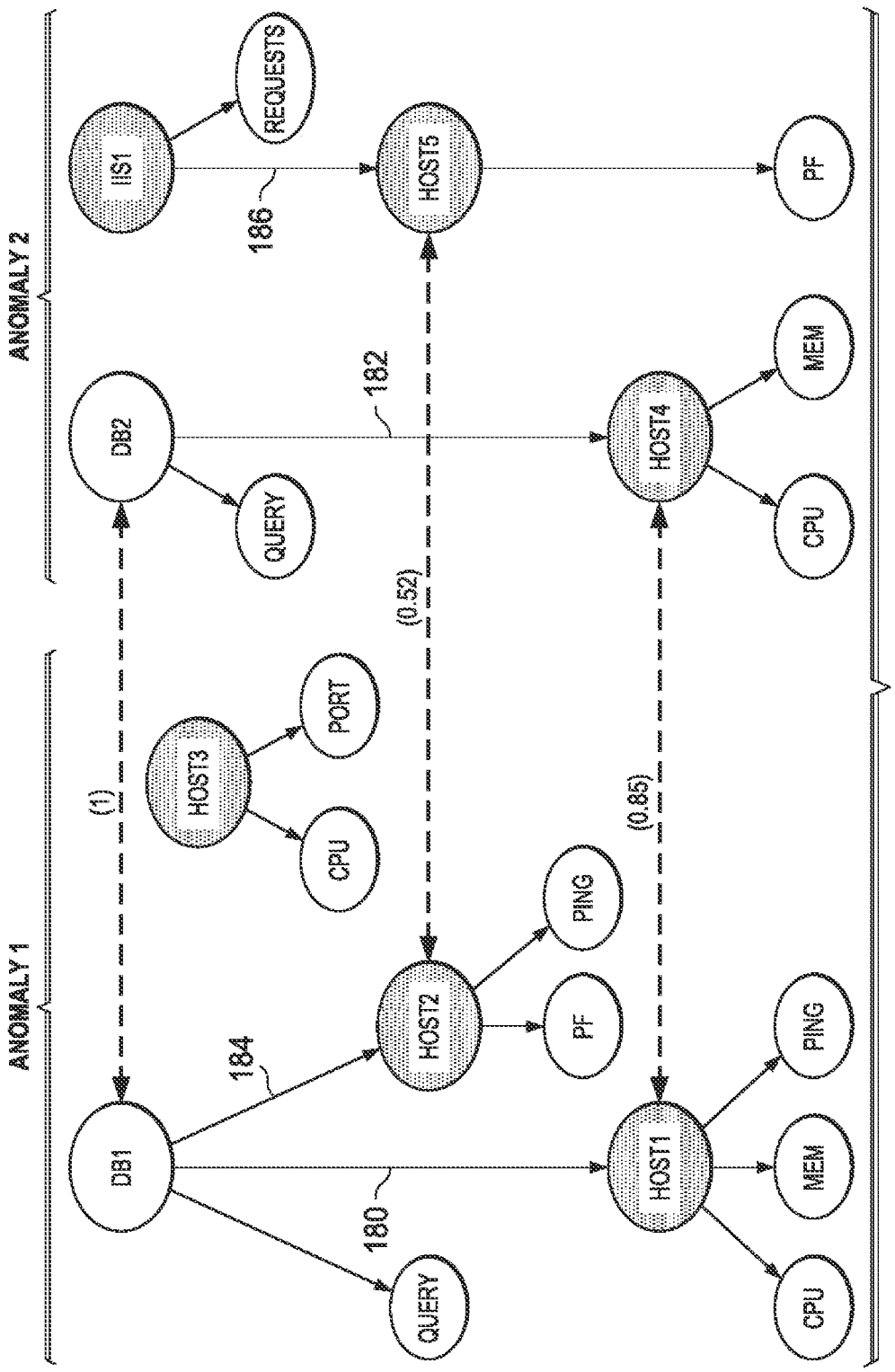

Once the cost functions for the example of FIG. 10 are processed through the combinatorial optimization function, the optimization function determines how the CIs are to be matched. In one example, FIG. 11 illustrates that HOST1 of Anomaly1 should be matched to HOST4 of Anomaly2, and that HOST2 of Anomaly1 should be matched to HOST5 of Anomaly2, thereby leaving HOST3 of Anomaly1 without a matching CI in Anomaly2. FIG. 12 illustrates all of the CIs of Anomalies1 and 2 and identifies the matching discussed above. The HOSTS are matched as discussed above and the databases DB1 and DB2 are matched. IIS1 and HOST3 remain unmatched. FIG. 13 shows another depiction of the Anomalies, their topologies and the matching between CIs. The dashed lines in FIG. 13 shows that a given CI in one anomaly is matched to another CI of the same type in the other anomaly. In the example of FIG. 13, the value of the score functions for the matching CIs is shown in parentheses on the dashed lines.

Figure 14:
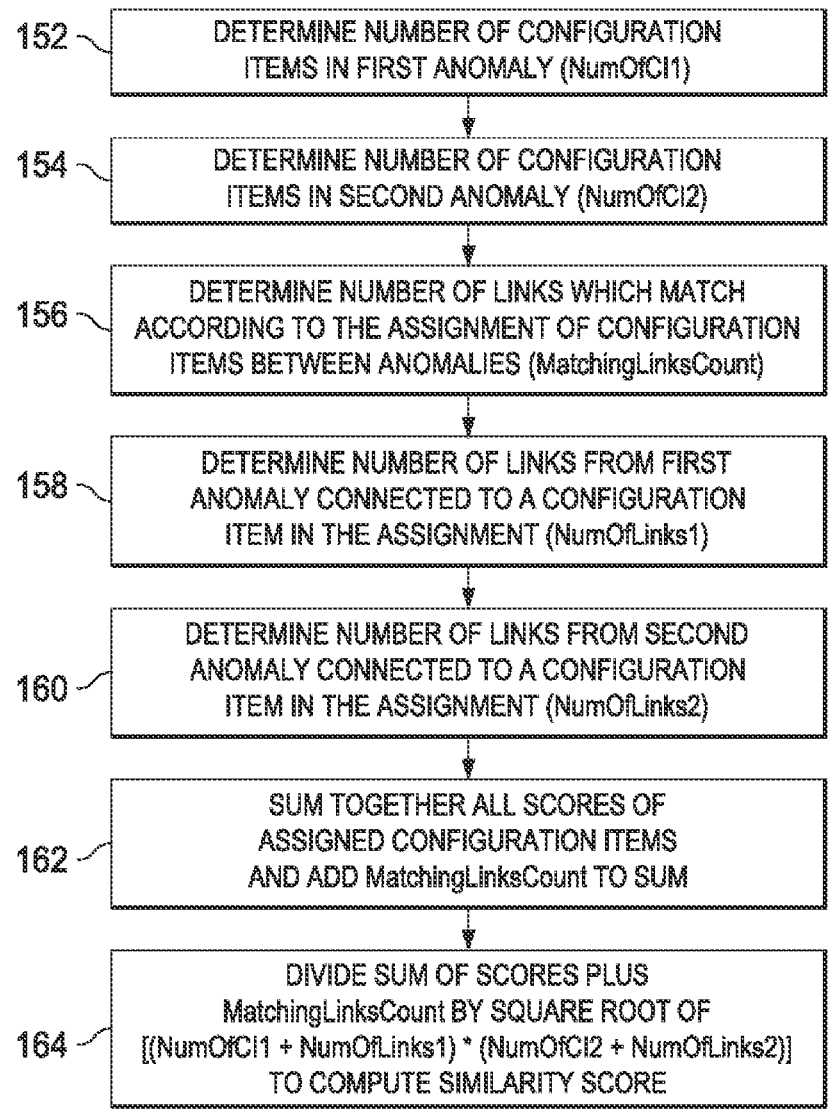
FIG. 14 shows further detail of the method of FIG. 6 in accordance with various embodiments.

Referring briefly to FIG. 6, per action 106, a similarity score is computed for the two anomalies once the various CIs are matched. FIG. 14 provides additional detail as to how a similarity score is computed in accordance with at least one embodiment. At 152, the number of CIs in Anomaly1 are determined (NumOfCI1). In the Example of FIG. 13, Anomaly1 has four CIs (DB1, HOST1, HOST2, and HOST3) and thus NumOfCI1 is 4. At 154, the number of CIs in Anomaly2 are determined (NumOfCI2). In the Example of FIG. 13, Anomaly2 has four CIs (DB2, HOST4, HOST5, and IIS1) and thus NumOfCI2 also is 4.

At 156, a determination is made as to the number of links that match between the two anomalies according to the matching of the CIs (MatchingLinksCount). In the Example of FIG. 13, only link 180, 182 links two CIs that have matched counterparts in both anomalies and thus the value of MatchingLinksCount is 1. There is one such matching pair of links and thus the value of MatchingLinksCount is 1 to reflect that single pair.

At 158, a determination is made as the number of links in Anomaly1 that are connected to a CI that has been matched to a CI in Anomaly2 (NumOfLinks1). In the example of FIG. 13, the two links 180 and 184 connect to CIs that have been matched and thus NumOfLinks1 has a value of 2.

Similarly, at 160 a determination is made as the number of links in Anomaly2 that are connected to a CI that has been matched to a CI in Anomaly1 (NumOfLinks2). In the example of FIG. 13, the two links 182 and 186 connect to CIs that have been matched and thus NumOfLinks2 has a value of 2.

At 162, the method comprises computing the sum of all score functions of the assigned CIs and then adding to that sum the value of MatchLinksCount. In the example of FIG. 13, as noted above the value of the score functions for the matching CIs is shown in parentheses on the dashed lines which indicate the matching CIs. Thus, the score functions 1, 0.85, and 0.52 are summed together and the value of MatchLinksCount, which is 1, is added to the sum. At 164, the result from action 162 is divided by the square root of [(NumOfCIs1+NumOfLinks1)*(NumOfCIs2+NumOfLinks2)]. The following equation illustrates the computations of actions 162 and 164 for the example of illustrated herein:

$$\frac{1 + 0.85 + 0.52 + 1}{\sqrt{[(4+2)*(4+2)]}} = 0.56$$

Thus, the similarity score for the example of Anomaly1 and Anomaly2 described herein is 0.56. See also FIG. 14 which illustrates the mathematical operations described above.

Using the embodiments described herein, a similarity score can be computed for two anomalies (i.e., two networks experiencing anomalous behavior). Moreover, similarity scores can be computed for multiple pairs of anomalous-behaving networks. For example, similarity scores can be computed for one anomaly relative to multiple other anomalies. The pair of networks corresponding to the highest similarity score indicates that those particular anomalies are most similar.

The determination as to which pair of anomalies is most similar can be used in a variety of ways. For example, an IT specialist may cause the anomaly determination server 50 to determine, based on similarity scores, which anomaly in historical anomaly data 58 is most similar to a network experiencing a problem that is being analyzed by the specialist. Once the specialist, other person for that matter, determines which historical anomaly is most similar, the specialist may determine how the historical anomaly was resolved. That resolution may be helpful to resolving the problem with the network under analysis.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of computing a similarity score between first and second anomalies, each anomaly comprising one or more configuration items (CI), one or anomaly metrics associated with at least some of the CI's, and at least one CI dependent on another CI via a link, the method comprising:
   for the first anomaly and for each CI of a given type in the first anomaly and a CI in the second anomaly of the same type, computing a score function corresponding to said CI's, said score function based on at least one of: the number of common anomaly metrics associated with said CI's for which the score function is computed, the number of CI types in common that are dependent on the given pair of CI's for which the score function is being computed, and the number of anomaly metrics associated with each of the CI's for which the score function is being computed;
   determining assignments between CIs of the first anomaly with CIs of the second anomaly; and
   computing a similarity score for the first and second anomalies based on the computed score functions and based on at least one of: the number of links which match between the anomalies, the number of CIs in each anomaly, and the number of links between CIs in each anomaly in which at least one of such CIs has been assigned to a CI in the other anomaly.

2. The method of claim 1 wherein computing the score function comprises computing a score function based on at least each of: the number of common anomaly metrics associated with said CI's for which the score function is computed, the number of CI types in common that are dependent on the given pair of CI's for which the score function is being computed, and the number of anomaly metrics associated with each of the CI's for which the score function is being computed.

3. The method of claim 1 wherein computing the similarity score comprises computing a similarity score based on at least each of a sum of the computed score functions as well as the number of links which match, the number of CIs in each anomaly, and the number of links between CIs in each anomaly in which at least one of such CIs has been assigned to a CI in the other anomaly.

4. A non-transitory, computer-readable storage medium (CRSM) containing software that, when executed by a processor, causes the processor to:
   assign configuration items (CI) of a first anomalous-behaving network to CIs of a second anomalous-behaving network, said assignments based at least on the number of common metrics for a pair of CIs of a common type; and
   determine a similarity score for the first and second anomalous-behaving networks based on the matched CIs and based at least on the number of inter-CI dependencies that match according to the CI assignments.

5. The non-transitory, CRSM of claim 4 wherein the software causes the processor to assign CIs between the first and second anomalous-behaving networks also by computing a cost function for each CI in the first anomalous-behaving network relative to each CI in the second anomalous-behaving network.

6. The non-transitory, CRSM of claim 5 wherein the software causes the processor to assign CIs between the first and second anomalous-behaving networks based also on a combinatorial optimization function applied to said cost functions.

7. The non-transitory, CRSM of claim 5 wherein the software causes the processor to determine the similarity score also based on the cost functions.

8. The non-transitory, CRSM of claim 4 wherein the software causes the processor to assign CIs between the first and second anomalous-behaving networks based also on the number of neighbor CI types in common between the first and second anomalous-behaving networks.

9. The non-transitory, CRSM of claim 4 wherein the software causes the processor to determine the similarity score also based on, for each anomalous-behaving network, the number of dependencies between CIs in which at least one such CI has been assigned to a CI in the other anomalous-behaving network.

10. A system, comprising:
    a computer readable storage medium that stores software; and
    a processor that accesses said computer readable storage medium and that executes the software;
    wherein, when executing the software, the processor abstracts configuration items (CI) in at least a first anomaly and a second anomaly based on type of CI, matches CIs of a common type between the first and second anomalies based on a cost function, and computes a similarity score for the first and second anomalies based, at least in part, on the cost function of the matched CIs and based on topology of the first and second anomalies.

11. The system of claim 10 wherein the processor matches the CIs of a common type based on a cost function by computing a score function between each pair of CIs of a common type among the first and second anomalies.

12. The system of claim 11 wherein each CI has one or more monitored metrics each metric being of a type, and at least some CIs being dependent on each other, and wherein processor computes the score function for a given pair of CIs comprises computing a score function based on one or more of:
    the number of metric types in common between the first and second anomalies;
    a metric weight value;
    the number of CI types in common that are dependent on the given pair of CIs for which the score function is being computed;
    the number of metrics of the first anomaly; and
    the number of metrics of the second anomaly.

13. The system of claim 11 wherein the processor applies an optimization function to the computed score functions.

14. The system of claim 11 the processor computes the similarity score by adding together the score functions of each of the pairs of CIs.

15. The system of claim 11 wherein the processor computes the similarity score by computing a similarity score based on the score functions, the number of inter-CI dependencies which match between the anomalies, the number of CIs in each anomaly, and the number of dependencies between CIs in each anomaly in which at least one of such CIs has been matched to a CI in the other anomaly.

* * * * *